(12) United States Patent
Watson et al.

(10) Patent No.: US 8,185,894 B1
(45) Date of Patent: May 22, 2012

(54) TRAINING A VIRTUAL MACHINE PLACEMENT CONTROLLER

(75) Inventors: Brian J. Watson, Chesapeake, VA (US); Chris D. Hyser, Victor, NY (US); Bret A. McKee, Fort Collins, CO (US); Robert D. Gardner, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 902 days.

(21) Appl. No.: 12/237,177

(22) Filed: Sep. 24, 2008

Related U.S. Application Data

(60) Provisional application No. 61/010,689, filed on Jan. 10, 2008.

(51) Int. Cl.
*G06F 9/455* (2006.01)

(52) U.S. Cl. .......................................................... 718/1

(58) Field of Classification Search ........................ 718/1
See application file for complete search history.

(56) References Cited

U.S. PATENT DOCUMENTS

| | | | |
|---|---|---|---|
| 5,479,599 A | 12/1995 | Rockwell et al. | |
| 5,555,370 A | 9/1996 | Li et al. | |
| 5,668,995 A | 9/1997 | Bhat | |
| 5,946,469 A | 8/1999 | Chidester | |
| 6,081,864 A | 6/2000 | Lowe et al. | |
| 6,370,560 B1 | 4/2002 | Robertazzi et al. | |
| 6,393,557 B1 | 5/2002 | Guthridge et al. | |
| 6,543,047 B1 | 4/2003 | Vrhel, Jr. et al. | |
| 6,560,606 B1 | 5/2003 | Young | |
| 6,564,112 B1 | 5/2003 | Factor | |
| 6,667,992 B1 | 12/2003 | Yanagawa | |
| 7,082,521 B1 | 7/2006 | Nanja | |
| 7,197,534 B2 | 3/2007 | Donoho et al. | |
| 7,203,944 B1 | 4/2007 | van Rietschote | |
| 7,257,811 B2 * | 8/2007 | Hunt et al. ........................ | 718/1 |
| 7,607,129 B2 | 10/2009 | Rosu | |
| 7,673,113 B2 | 3/2010 | Sugumar | |
| 7,716,667 B2 | 5/2010 | van Rietschote | |
| 7,849,286 B2 | 12/2010 | Sugumar | |
| 7,984,449 B2 * | 7/2011 | Baran et al. ................... | 719/313 |
| 2003/0023435 A1 | 1/2003 | Josephson | |
| 2004/0230970 A1 | 11/2004 | Janzen | |
| 2004/0244000 A1 | 12/2004 | Frank | |
| 2005/0251802 A1 * | 11/2005 | Bozek et al. ..................... | 718/1 |
| 2005/0262091 A1 | 11/2005 | Marvin | |
| 2005/0268298 A1 * | 12/2005 | Hunt et al. ........................ | 718/1 |
| 2007/0006205 A1 | 1/2007 | Kennedy | |
| 2007/0043860 A1 | 2/2007 | Pabari | |
| 2007/0169121 A1 * | 7/2007 | Hunt et al. ........................ | 718/1 |
| 2007/0171921 A1 * | 7/2007 | Wookey et al. ................ | 370/401 |
| 2007/0174410 A1 * | 7/2007 | Croft et al. ..................... | 709/208 |

(Continued)

OTHER PUBLICATIONS

U.S. Appl. No. 12/236,271, Non-Final Office Action dated Sep. 21, 2011, pp. 1-10 and attachments.

*Primary Examiner* — Aimee Li

(57) ABSTRACT

To train a virtual machine placement controller, the placement controller determines a new layout of virtual machines that is different from an existing layout of the virtual machines, according to criteria. The placement controller transmits the information relating to the new layout to a user interface. The placement controller receives feedback from the user interface, the received feedback indicating a user response to the new layout. The placement controller then modifies the criteria in response to the received feedback.

23 Claims, 2 Drawing Sheets

U.S. PATENT DOCUMENTS

| | | |
|---|---|---|
| 2007/0180436 A1 | 8/2007 | Travostino |
| 2007/0204266 A1* | 8/2007 | Beaty et al. ................ 718/1 |
| 2008/0104587 A1* | 5/2008 | Magenheimer et al. ........ 718/1 |
| 2008/0104608 A1* | 5/2008 | Hyser et al. ................ 718/105 |
| 2008/0127182 A1* | 5/2008 | Newport et al. ................ 718/1 |
| 2008/0163207 A1* | 7/2008 | Reumann et al. ................ 718/1 |
| 2009/0051492 A1* | 2/2009 | Diaz et al. .................... 340/10.1 |
| 2009/0113422 A1* | 4/2009 | Kani ................ 718/1 |

\* cited by examiner

TRAINING A VIRTUAL MACHINE PLACEMENT CONTROLLER

CROSS REFERENCE TO RELATED APPLICATIONS

This application claims the benefit of U.S. Provisional Application Ser. No. 61/010,689, filed Jan. 10, 2008, titled "Training a Virtual Machine Placement Controller"

BACKGROUND

Virtual machines can be provided in a computer to enhance flexibility and performance. A virtual machine typically refers to some arrangement of components (software and/or hardware) for virtualizing or emulating an actual computer, where the virtual machine can include an operating system and software applications. Virtual machines can allow different operating systems to be deployed on the same computer, such that applications written for different operating systems can be executed in different virtual machines (that contain corresponding operating systems) in the same computer. Moreover, the operating system of a virtual machine can be different from the host operating system that may be running on the computer on which the virtual machine is deployed.

In addition, a greater level of isolation is provided between or among applications running in different virtual machines. In some cases, virtual machines also allow multiple applications to more efficiently share common resources (processing resources, input/output or I/O resources, and storage resources) of the computer.

For enhanced performance, virtual machines can be provided on multiple computers that are interconnected by a network. In some implementations, an automated placement controller has been provided to determine computers that the virtual machine is to be deployed on. Based on predetermined criteria, the placement controller is able to migrate at least some of the virtual machines across different computers.

In some cases, a placement controller may not be aware of one or more criteria that the placement controller should consider when performing migration of virtual machines. As a result, the placement controller can select a placement of virtual machines that a user or administrator may be dissatisfied with. Conventionally, when this happens, the user or administrator has to manually determine why the placement controller's proposed placement of virtual machines is unsatisfactory and manually modify the placement controller's criteria, to prevent it from repeatedly proposing the same placement of virtual machines. Such manual analysis is time-intensive and is prone to error.

BRIEF DESCRIPTION OF THE DRAWINGS

Some embodiments of the invention are described with respect to the following figures.

DETAILED DESCRIPTION

In accordance with some embodiments, a technique or mechanism is provided to enable the training of a virtual machine placement controller (or plural virtual machine placement controllers). In the ensuing discussion, reference is made to training one virtual machine placement controller. However, note that techniques for mechanisms according to some embodiments can also be applied to training multiple virtual machine placement controllers.

Generally, a virtual machine placement controller is able to automatically select one or more layouts for virtual machines according to various criteria. A "layout" of virtual machines refers to placement of virtual machines on physical machines. A proposed layout, as selected by the placement controller, can be communicated to an administrative station, with the administrative station presenting the proposed layout to an administrator (or other user). The administrator can decline (reject) the proposed layout, such as by selecting some clickable control item in a graphical user interface (GUI) presented by the administrative station, or by activating some other type of input device. In response to the declined proposed layout, the placement controller can present one or more questions to the administrative station for answer by the administrator. The rejection of the proposed layout along with answers to questions posed by the placement controller constitute examples of feedback to the placement controller regarding the proposed layout. Instead of a question-and-answer format, the administrator can alternatively provide an explanation along with the rejection of the proposed layout. The explanation can be freeform text entered by the administrator, or text and/or selections made in a predefined form. Alternatively, the administrator can provide some other type of feedback, such as a modified layout of virtual machines.

Based on the feedback, the placement controller is able to modify criteria that the placement controller uses to select layouts for virtual machines. Modifying the criteria can include adding one or more new criteria, changing one or more existing criteria, or deleting one or more existing criteria.

Examples of physical machines include computers (e.g., application servers, storage servers, web servers, etc.), communications modules (e.g., switches, routers, etc.), and other types of machines. "Physical machine" indicates that the machine is an actual machine made up of software and hardware. A virtual machine refers to some partition or segment (made up of software and/or hardware) of the physical machine that is provided to virtualize or emulate a physical machine. From the perspective of a user, a virtual machine looks just like a physical machine.

Figure 1:
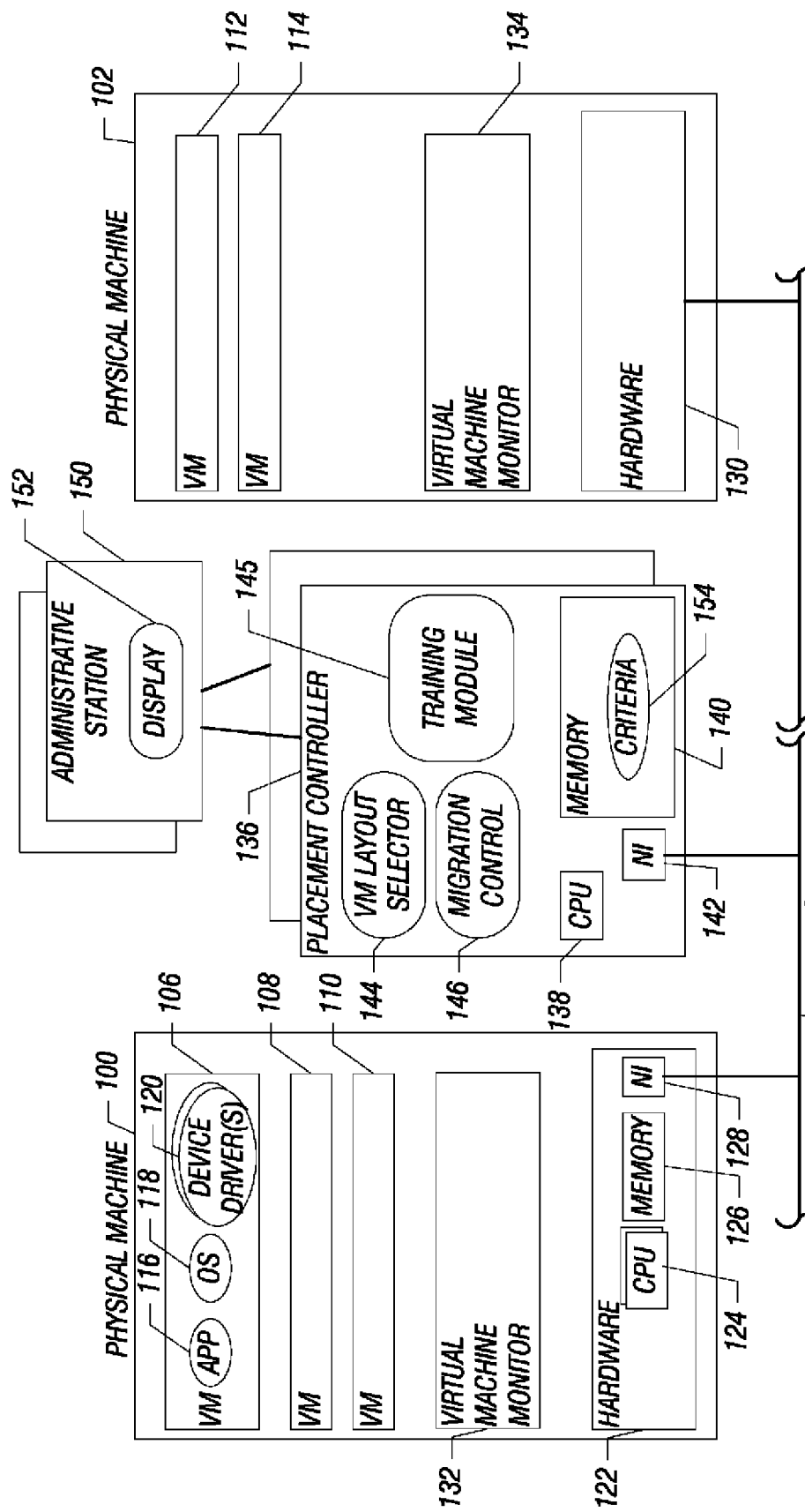
FIG. 1 is a block diagram of a system of physical machines on which virtual machines are deployed, where the system further includes a placement controller to perform automated selection of virtual machine layouts, and an administrative station to allow for cooperation between the placement controller and an administrator for training the placement controller, in accordance with some embodiments.

FIG. 1 illustrates a system that includes multiple physical machines 100, 102 that are interconnected by a network 104. Examples of the network 104 include a local area network (LAN), a wide area network (WAN), the Internet, or any other type of communications link. The physical machines can be located within one cabinet (or rack), or alternatively, the physical machines can be located in multiple cabinets (or racks). The network 104 can also include system buses or other fast interconnects. The system depicted in FIG. 1 can be any one of an application server farm, a storage server farm (or storage area network), a web server farm, a switch or router farm, other type of data center, and so forth. Although just two physical machines are depicted in FIG. 1, it is noted that more than two physical machines can be utilized in other implementations.

Although each of the physical machines is depicted as being contained within a box, it is noted that a physical machine can be a distributed machine having multiple nodes that provide a distributed and parallel processing system.

Within each of the physical machines are various virtual machines (VMs). In the example of FIG. 1, three virtual machines 106, 108, and 110 are depicted in the physical machine 100, and two virtual machines 112, 114 are depicted in the physical machine 102. Note that the numbers of virtual machines in each physical machine shown in FIG. 1 are provided for purposes of example, as different implementations can employ different numbers (one or more) of virtual machines in the corresponding physical machines.

As depicted in FIG. 1, the virtual machine 106 includes one or more software applications 116, an operating system 118, and one or more device drivers 120 (which are typically part of the operating system 118). The other virtual machines 108, 110, 112, 114 can also contain software applications, operating systems, and device drivers.

It is noted that the operating systems that are part of corresponding virtual machines within a physical machine can be different types of operating systems or different versions of an operating system. This allows software applications designed for different operating systems to execute on the same physical machine.

The virtual machines within a physical machine are designed to share the physical resources of the physical machine. In the physical machine 100, these physical resources are part of the hardware 122, which includes one or more central processing units (CPUs) 124, memory (volatile memory and/or persistent storage, such as disk-based storage) 126, a network interface 128, and other resources (such as a storage area network interface, not shown). Hardware 130 in the physical machine 102 contains similar components.

In some example implementations, the physical machine 100 also includes a virtual machine monitor (VMM) 132, also called a hypervisor, which manages the sharing (by virtual machines 106, 108, 110) of the physical resources, including the hardware 122, of the physical machine 100. In some other implementations, the VMM can be omitted, and instead, a host operating system can run virtualization software. The VMM 132 virtualizes the physical resources, including the hardware 122, of the physical machine 100. Also, the VMM 132 intercepts requests for resources from operating systems in the respective virtual machines 106, 108, 110 so that proper allocation of the physical resources of the physical machine 100 can be performed. For example, the VMM 132 manages memory access, input/output (I/O) device access, and CPU scheduling for the virtual machines. Effectively, the VMM 132 provides an interface between the operating system of each virtual machine and the underlying hardware 122 of the physical machine 100. In some examples, the interface provided by the VMM 132 to an operating system of a virtual machine is designed to emulate the interface provided by the actual hardware of the physical machine 100. In other implementations, the VMM 132 may present another type of interface.

The physical machine 102 similarly includes a VMM 134 that provides the interface between the virtual machines 112, 114 and the physical resources, including hardware 130, of the physical machine 102.

In accordance with some embodiments, one or more placement controllers 136 are provided on the network 104 to provide automated management of the placement of virtual machines in corresponding physical machines 100, 102 (and any other physical machines in the system depicted in FIG. 1). In the ensuing discussion, reference is made to just one placement controller 136; however, note that the tasks of the one placement controller 136 can be performed by multiple placement controllers.

The placement controller 136 is able to determine an efficient placement of the virtual machines on corresponding physical machines based on predefined criteria (according to a target policy set by an enterprise, a user, an administrator, etc.). The predefined criteria according to the policy can include a target quality-of-service level to be provided, loading criteria (which specify some target loading level on a physical resource or machine), balancing criteria (which specify that load on physical machines should be balanced when possible), cooling criteria (which specify temperatures in physical machines that should not be exceeded), power criteria (which specify that power consumption should be reduced where possible), cost of migrating virtual machines, criteria indicating which virtual machines should be run on a common physical machine, criteria indicating which virtual machines should be run on different physical machines, criteria specifying a limit on frequency of virtual machine migration, and other criteria.

The placement controller 136 is able to determine whether the current state of the overall system (which includes the multiple physical machines) conforms to the policy. If the placement controller 136 determines that the state of the system does not conform to the policy, then the placement controller 136 can perform a re-evaluation to determine a different placement of virtual machines on physical machines to increase conformance to the policy.

If a different placement is determined by the placement controller 136 to be desirable, the placement controller 136 is able to select new layouts of virtual machines, where a new layout of virtual machines on physical machines is different from a prior layout of the virtual machines on the physical machines. According to the new layout, the placement controller is able to perform migration of virtual machines from one physical machine to another physical machine. After placement of the virtual machines has been changed (by migration), the placement controller 136 can subsequently determine whether further migration should be performed. Note that workloads at the physical machines are continually changing. The placement controller 136 repeatedly checks (in a loop) whether the state of the system conforms to policy. In effect, the placement controller 136 provides a feedback-driven mechanism to control the mapping of virtual machines onto physical machines. This feedback-driven mechanism allows automated adjustments of placement of the virtual machines on physical machines. By automating the virtual machine placement control, relatively quick response times can be achieved in changing placements of virtual machines in response to observed or predicted events that affect conformance with policy.

The feedback-driven mechanism of selecting layouts based on workloads and changing conditions of physical machines and virtual machines is one example of the feedback considered by the placement controller. In accordance with some embodiments, another form of feedback considered by the placement controller 136, as discussed above, is feedback provided by an administrator (or other user) through an administrative station 150 that is coupled to the placement controller 136.

When the placement controller 136 selects a proposed layout of virtual machines, the placement controller 136 can provide the proposed layout to the administrative station 150, which can then be presented (such as in a display 152 of the administrative station) to an administrator. Through input devices of the administrative station 150, the administrator can provide some type of feedback in response to the proposed layout. The feedback can include a rejection of the proposed layout along with explanation provided by the administrator. The explanation can be provided as answers in response to questions posed by the placement controller, or alternatively, the explanation can include freeform text or text and/or selections made in a predefined form. As yet another alternative, the feedback can be in the form of a modified layout. The feedback is provided back to the placement controller 136. Based on the received feedback, the placement controller 136 is able to modify the criteria considered by the placement controller 136 in selecting layouts of virtual machines.

In this manner, the placement controller 136 is trainable by an administrator (or by a group of administrators) to learn the appropriate criteria for use in selecting layouts for virtual machines. The group of administrators can be a group of experts, for example, who are familiar with criteria to be used by the placement controller 136. The group of administrators can be positioned at multiple administrative stations that are able to receive proposed layouts from the placement controller 136. Effectively, a machine learning mechanism is implemented in the placement controller 136 to allow the placement controller 136 to learn criteria to be used for selecting layouts of virtual machines based on feedback from one or more administrators. Machine learning refers to the ability of the placement controller 136 to learn during operation of the placement controller based on input to the placement controller, where the input in this case is feedback to proposed layouts of virtual machines.

As further depicted in FIG. 1, each placement controller 136 includes one or more CPUs 138 and memory 140. Also, a network interface 142 is provided in the placement controller 136 to allow communication between the placement controller 136 and the network 104.

The placement controller 136 also includes a VM layout selector 144 (to perform selection of a layout of the virtual machines mapped to physical machines) according to criteria 154 stored in the memory 140, in accordance with some embodiments. Additionally, the placement controller 136 includes a migration control module 146 to control migration of virtual machines from one physical machine to another physical machine (in accordance with the layout selected by the VM layout selector 144). Also, the placement controller 136 includes a training module 145 for learning criteria to be used for virtual machine placement control according to feedback received from administrative station(s). Based on the machine learning performed by the training module 145, the training module 145 is able to modify the criteria 154 stored in the memory 140. Modifying the criteria 154 includes adding one or more new criteria, changing one or more existing criteria, or deleting one or more existing criteria. In some implementations, the VM layout selector 144, training module 145, and migration control module 146 are software modules executable on the CPU(s) 138 of the placement controller 136.

The criteria 154 considered by the VM layout selector 144 in selecting placements of virtual machines on physical machines can be of various types. One type of criteria is related to loading of physical resources (including hardware 122) or machines. Since there are various different physical resources (e.g., CPU, memory, network interface, storage network, etc.), there are different loading criteria to consider. The different loading criteria thus include a loading criterion relating to the CPU usage, a loading criterion relating to memory usage, a loading criterion relating to network interface usage, a loading criterion relating to storage network usage, and any other loading criteria relating to usage of other resources. Each of the resources is associated with a respective dimension.

Also, another loading criterion is an overloading criterion, which specifies that any particular physical machine should not be loaded by greater than some predefined threshold (e.g., 80%). If loading of a physical machine exceeds this predefined threshold, then migration of virtual machine(s) from the overloaded physical machine would be desirable.

As noted above, placement of virtual machines should satisfy a quality of service ("QoS") goal of the system, which is another type of criteria. A QoS may have been set by a user or by the system. One example QoS goal is the allocation of scheduling shares to each virtual machine within a physical machine. Another example QoS goal is to set a maximum response time or minimum application throughput. The VMM 132 according to some example implementations includes a scheduler that schedules access to physical resources of the physical machine 100, where the scheduler in the VMM 132 specifies the number of shares to allocate to each virtual machine. For example, 2,000 shares may be allocated to virtual machine 106, 1,000 shares may be allocated to virtual machine 108, and another 1,000 shares may be allocated to virtual machine 110. In this example scenario, virtual machine 106 has one-half shares of the physical machine 100. The one-half share of the physical resources of the physical machine can be considered a QoS goal of the virtual machine 106. Thus, if the placement controller 136 decides to migrate virtual machine 106 from physical machine 100 to another physical machine, such as physical machine 102, the placement controller 136 checks to ensure that after migration the QoS for virtual machine 106 can be kept at the same ratio.

Other example types of criteria that are considered by the VM layout selector 144 include cooling and power criteria. During operation, temperatures in physical machines can exceed a temperature threshold. If this occurs, then migration of virtual machines from the over-heated physical machines may be desirable. Cooling criteria can also specify cooling costs. In large data centers, for example, sophisticated cooling equipment is usually provided to cool physical machines. To reduce cooling costs, migration of virtual machines can be performed in a manner that allows some part of the cooling equipment to be turned off (or run in a lower power mode). In one example, virtual machines can be placed such that one or more physical machines can be turned off (or placed in a lower power state), such that corresponding cooling equipment can be shut off (or run in a lower power mode). The lower power state of a physical machine refers to any one of several possible power savings states of such machines, including sleep states, standby states, hibernation states, and so forth.

Power criteria are also considered by the VM layout selector 144. In addition to turning off (or placing into a lower power state) physical machines for the purpose of reducing cooling costs, such action can also be performed for the purpose of reducing power consumption of physical machines (for more efficient usage).

Both the cooling criteria and power criteria are considered consolidation criteria that favor migrating virtual machines onto fewer physical machines so that at least some of the physical machines can be turned off or otherwise placed into an idle state, for cost and power conservation. However, the cooling and power criteria are counter-balanced by some of the other factors, such as loading criteria that tend to favor distributing or spreading virtual machines across a larger number of physical machines.

Another criterion that is considered by the VM layout selector 144 is the cost of performing migration of a virtual machine. Migrating a virtual machine from one physical machine to another physical machine is associated with a cost (in terms of the virtual machine being unavailable during migration and the bandwidth cost associated with moving data associated with the migrated virtual machine from one storage location to another storage location). If the VM layout selector 144 determines that the benefit of migrating a virtual machine is less than the cost of performing the migration, then the migration should not be performed.

As mentioned above, further criteria considered by the placement controller include criteria indicating which virtual machines should be run on a common physical machine, criteria indicating which virtual machines should be run on different physical machines, and criteria specifying a limit on the frequency of virtual machine migration (in other words, a limit on how often virtual machines should be migrated within some predefined time interval).

Figure 2:
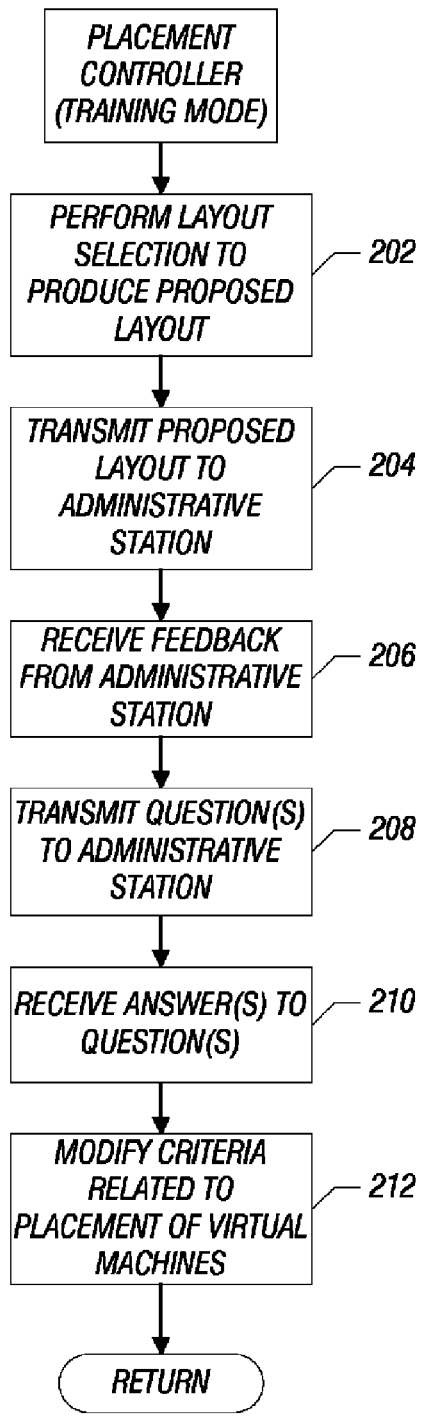
FIG. 2 is a flow diagram of a process of training the placement controller, in accordance with an embodiment.

FIG. 2 shows an example process performed by a placement controller that is in training mode. In training mode, the placement controller involves one or more users as part of the control loop, to allow such one or more users to approve or reject proposed layouts selected by the placement controller. Note that the placement controller can also be executed in normal mode, where in normal mode, the placement controller would not provide proposed layouts to users for approval or rejection.

In an alternative implementation, there is no distinction between training mode and normal mode. In such an implementation, the placement controller would log layouts selected during operation of the placement controller into one or more logging files. Users can later go to the one or more logging files to analyze virtual machine placements made by the placement controller. If a user determines that any of the selected layouts is improper, then the user may provide feedback to the placement controller 136, using the administrative station 150 (FIG. 1).

According to FIG. 2, the placement controller performs (at 202) layout selection to produce a proposed layout of the virtual machines across physical machines. The proposed layout is transmitted (at 204) to the administrative station 150. Feedback is then received (at 206) from the administrative station, where the feedback can be an approval or a rejection of the proposed layout. If the received feedback is an approval, then the placement controller can treat the proposed layout as an acceptable layout, and as a result, no modification of criteria used by the placement controller to select virtual machine placement has to be made.

On the other hand, if the feedback is a rejection of the proposed layout, then the placement controller would have to obtain further information to determine the reasons for the rejection. In some embodiments, to do so, the placement controller is able to transmit (at 208) one or more questions to the administrative station for presentation to the user. Upon receipt of the question(s), the user will provide answer(s) which is (are) transmitted by the administrative station 150 and received (at 210) by the placement controller. The received answer(s) constitutes further feedback from the administrative station regarding the proposed layout. As discussed above, instead of the question-and-answer format, a user can provide another type of feedback. In accordance with the received feedback, the placement controller modifies (at 212) the criteria related to placement of virtual machines.

In some implementations, the question(s) presented to a user can be closed-form questions, such as yes/no questions or multiple-choice questions. From answers to such questions, the placement controller is able to deduce the possible criteria that influenced the user's decision.

In one example, a proposed layout may involve moving a first virtual machine (VM-1) from physical machine PM-A to physical machine PM-B. If the user declines this action, the questions posed by the placement controller can be as follows, in one example:

Q: Do you want VM-1 to run on the same PM as some of the other VMs on PM-A?
A: No.
Q: Do you want VM-1 to run on a different PM than some of the other VMs on PM-B?
A: Yes.
Q: Select VMs from which VM-1 must be separated: VM-5, VM-6, VM-7.
A: VM-5, VM-7.
Q: Would you like to add the following constraints: VM-1 and VM-5 must be separate, VM-1 and VM-7 must be separate?
A: Yes.
Q: Thank you.

The above sequence of questions allows the placement controller to determine criteria relating to which virtual machines should be separated (by placement in different physical machines) from other virtual machines.

By using the user-based feedback mechanism to train a placement controller, an automated mechanism is provided that allows for the placement controller to automatically determine modifications to criteria, rather than having a user manually figure out what criteria modifications should be made. Closed-form questions presented to the user should be easy for a user to answer, in some implementations. Moreover, the mechanism can be automatically activated or triggered by a declined action, rather than depending on the user to manually navigate to some configuration user interface.

The tasks of FIG. 2 may be provided in the context of information technology (IT) services offered by one organization to another organization. For example, the infrastructure (including the placement controllers, physical machines, and virtual machines of FIG. 1) may be owned by a first organization. The IT services may be offered as part of an IT services contract, for example.

In accordance with an embodiment, a simulated annealing technique is used by the VM layout selector 144 to find an approximation of an optimal placement of virtual machines on physical machines. Note that other techniques can be used in other implementations. Generally, simulated annealing considers a current set (that represents some random placement of virtual machines on physical machines), and iteratively adjusts the current set until a better set can be identified. The simulated annealing algorithm attempts to replace a current solution with a random "nearby" solution. A new set that is more optimal than the current set is used as the new current set, and this process repeats until an approximated optimal solution is identified.

The simulated annealing algorithm performed by the VM layout selector 144 is based on a cost function (alternatively referred to as a "goodness function") that takes into account various constraints that represent the predefined criteria described above. The cost function is represented by some aggregation of terms, where each term is multiplied by a weight factor. Generally, the cost function has the form: $f = w_1 \times t_1 + w_2 \times t_2 + \ldots$, where the $t_i$ terms (i=1 to N) represent corresponding criteria (N total criteria, where N is an integer) to be considered, and the $w_i$ parameters represent weights to be applied to the terms. As examples, the $t_i$ terms can represent resource loading criteria (n terms to correspond to the n dimensions of resources), balancing criteria, cooling criteria, power criteria, and so forth. The weight to be multiplied to each term generally represents the importance of the corresponding term in computing the goodness rating for a particular layout of virtual machines.

Each of the terms in the cost function is based on parameters measured or estimated by the VM layout selector 144. For a given layout of virtual machines, parameters corresponding to the various criteria being considered are measured or estimated. For example, parameters relating to resource utilization, cooling costs, power consumption, balancing, and so forth, for a given layout of virtual machines can be measured or estimated. Note that the parameters corresponding to the current layout (the layout that is currently being used) can be measured by the VM layout selector 144. However, when considering alternative layouts (which are trial layouts not yet implemented) to compare to the current layout, the parameters for the alternative layouts may have to be estimated (using an internal model provided with the VM layout selector 144), where the model can be generated based on historical information. The measured or estimated parameters are then translated to the terms of the cost function. Thus, for each given layout of virtual machines, the cost function outputs a goodness rating indicator.

Figure 3:
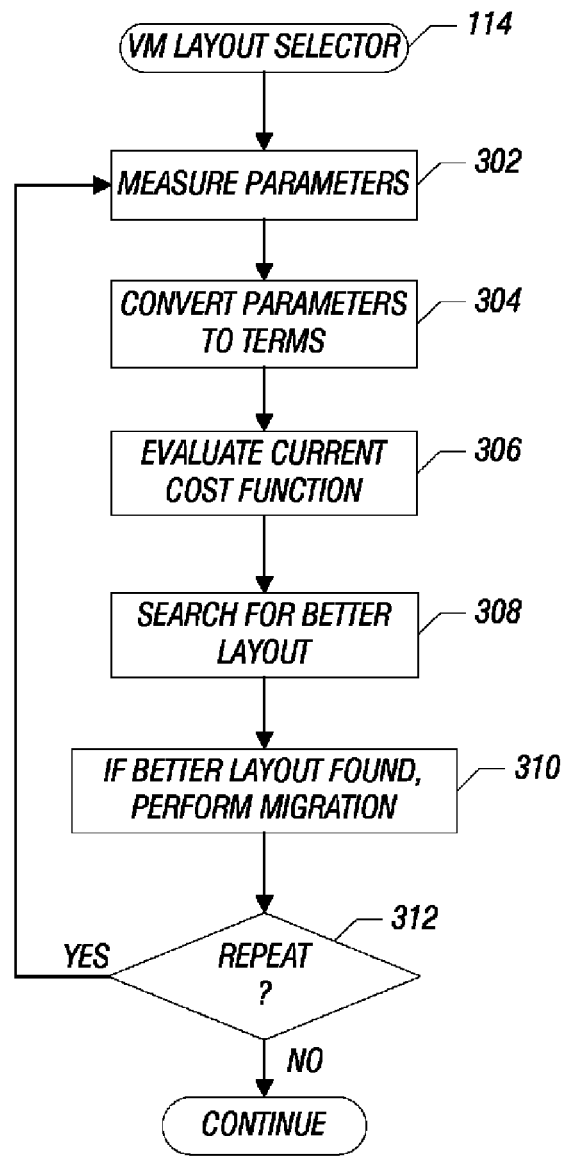
FIG. 3 is a flow diagram of a process of the placement controller selecting a layout of virtual machines, in accordance with an embodiment.

A flow diagram of a process performed by the VM layout selector 144 is depicted in FIG. 3. The flow of FIG. 3 is performed repeatedly, such as at regular intervals or in response to predefined events. The VM layout selector 144 of the controller 136 measures (at 302) various parameters relating to the terms to be considered for the cost function discussed above. The measured parameters are converted (at 304) into the terms for use in the cost function.

The VM layout selector 144 then evaluates (at 306) the cost function based on the terms derived from the measured parameters. The cost function produces an output that provides some indication of the performance of the particular placement of virtual machines on physical machines (such as in the form of a goodness rating or some other indicator). Next, the VM layout selector 144 searches (at 308) for a better layout that represents another placement of virtual machines on physical machines.

If a better virtual machine layout is found in the search (at 308) for the better layout, the VM layout selector 144 causes the migration module 146 to perform (at 310) migration of one or more virtual machines according to the better virtual machine layout. Migrating a virtual machine refers to moving the state of the virtual machine from one physical machine to another physical machine. The state of the virtual machine includes content of registers of various hardware devices (e.g., CPUs, I/O devices, and so forth). Data in memory associated with the migrated virtual machine can also be transferred gradually (e.g., lazily) to the destination physical machine to which the virtual machine is migrated.

The VM layout selector 144 determines (at 312) if the process at 304-310 is to be repeated. Repetition of the process at 304-310 can be performed periodically or in response to predefined events (e.g., detection of overheating, alarm indicating some fault has occurred, and indication of overloading, etc.).

Instructions of software described above (including the training module 145, VM layout selector 144, and migration control module 146 of FIG. 1) are loaded for execution on a processor (such as one or more CPUs 138 in FIG. 1). The processor includes microprocessors, microcontrollers, processor modules or subsystems (including one or more microprocessors or microcontrollers), or other control or computing devices. As used here, a "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of training a virtual machine placement controller, comprising:

according to criteria, determining, by the placement controller, a new layout of virtual machines on physical machines that is different from an existing layout of the virtual machines on the physical machines;

transmitting, by the placement controller, information relating to the new layout to a user interface;

receiving, by the placement controller, feedback from the user interface, the received feedback indicating a user rejection of the new layout;

automatically triggering a mechanism to collect further feedback from the user interface in response to the user rejection; and modifying, by the placement controller, the criteria in response to the further feedback.

2. The method of claim 1, further comprising:

causing a number of questions to be presented to the user interface; and receiving user answers to the questions, where the further feedback comprises the user answers.

3. The method of claim 2, wherein causing the questions to be presented comprises causing closed-form answers to be presented.

4. The method of claim 1, wherein the further feedback comprises an explanation regarding the user rejection of the new layout of virtual machines.

5. The method of claim 1, wherein modifying the criteria comprises modifying the criteria selected from among: target quality of service, power criteria, cooling criteria, criteria relating to constraint on movement of virtual machines, criteria indicating which virtual machines are to be deployed on a common physical machine, criteria indicating which virtual machines are to be deployed on different physical machines, and cost of virtual machine migration.

6. The method of claim 1, wherein the determining, transmitting, receiving, triggering, and modifying tasks are performed by the placement controller in training mode.

7. The method of claim 6, further comprising:
the placement controller operating in normal mode to select layouts of virtual machines on physical machines, wherein in normal mode the placement controller does not wait for feedback from a user prior to effecting a selected layout.

8. The method of claim 1, further comprising:
according to the modified criteria, determining, by the placement controller, a second new layout of virtual machines on physical machines;
transmitting, by the placement controller, information relating to the second new layout to the user interface;
receiving, by the placement controller, further negative feedback from the user interface regarding the second new layout; and
further modifying the criteria by the placement controller in response to the further negative feedback.

9. The method of claim 1, further comprising selecting a second new layout of the virtual machines on the physical machines according to the modified criteria.

10. The method of claim 1, further comprising:
transmitting, by the placement controller, the information relating to the new layout to at least another user interface;
receiving, by the placement controller, additional feedback from the at least second user interface, the additional feedback indicating a further response from at least another user to the new layout; and
modifying, by the placement controller, the modified criteria in response to the additional feedback.

11. The method of claim 1, further comprising providing information technology services, wherein the determining, transmitting, receiving, and modifying tasks are part of the information technology services.

12. The method of claim 1, wherein modifying the criteria in response to the further feedback is part of a process of learning the criteria used by the placement controller based on user feedback.

13. A placement controller comprising:
a processor;
a layout selector executable on the processor to select a proposed layout of virtual machines on physical machines; and
a training module executable on the processor to:
communicate the proposed layout to an administrative station;
receive a response to the proposed layout;
if the received response is a negative response, triggering a mechanism to obtain feedback regarding the negative response to the proposed layout; and
modify criteria used by the layout selector in selecting layouts of virtual machines according to the obtained feedback.

14. The placement controller of claim 13, wherein the training module is to implement machine learning to learn the criteria to use for virtual machine layout selection in response to the obtained feedback to the proposed layout.

15. The placement controller of claim 13, wherein the training module, in response to a positive feedback to the proposed layout, is to allow the layout selector to implement the proposed layout.

16. The placement controller of claim 15, further comprising a migration control module executable on the processor to cause migration of at least one virtual machine from a first physical machine to a second physical machine according to the proposed layout.

17. The placement controller of claim 13, wherein the criteria is selected from among: target quality of service, power criteria, cooling criteria, criteria relating to constraint on movement of virtual machines, criteria indicating which virtual machines are to be deployed on a common physical machine, criteria indicating which virtual machines are to be deployed on different physical machines, and cost of virtual machine migration.

18. The placement controller of claim 13, wherein the training module is executable to further:
cause a number of questions to be presented in a user interface of the administrative station; and
receive user answers to the questions, wherein the obtained feedback includes the user answers.

19. An article comprising at least one computer-readable storage medium containing instructions that when executed cause a placement controller to:
according to criteria, determine a new layout of virtual machines on a first group of physical machines that is different from an existing layout of the virtual machines on a second group of physical machines;
cause transmission of information relating to the new layout to a user interface;
receive feedback from the user interface, the received feedback indicating a user rejection of the new layout;
automatically trigger a mechanism to collect further feedback from the user interface in response to the user rejection; and
modify the criteria in response to the further feedback.

20. The article of claim 19, wherein the first and second groups of physical machines can be different groups or the same group.

21. The article of claim 19, wherein the further feedback comprises user explanation for rejecting the new layout.

22. The article of claim 19, wherein the instructions when executed cause the placement controller to determine a second new layout according to the modified criteria.

23. The article of claim 19, wherein the instructions when executed cause the placement controller to further:
cause a number of questions to be presented in a user interface of the administrative station; and
receive user answers to the questions, wherein the further feedback includes the user answers.

* * * * *